(12) United States Patent
Nakagawa et al.

(10) Patent No.: US 12,071,125 B2
(45) Date of Patent: Aug. 27, 2024

(54) VEHICLE CONTROL APPARATUS

(71) Applicant: TOYOTA JIDOSHA KABUSHIKI KAISHA, Toyota (JP)

(72) Inventors: Takuya Nakagawa, Nagoya (JP); Tsutomu Mochida, Shizuoka-ken (JP); Toshihiro Takagi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 17/692,422

(22) Filed: Mar. 11, 2022

(65) Prior Publication Data

US 2022/0297678 A1     Sep. 22, 2022

(30) Foreign Application Priority Data

Mar. 16, 2021  (JP) .................... 2021-041944

(51) Int. Cl.
*B60W 30/06*  (2006.01)
*B60K 35/00*  (2024.01)
*B60K 35/22*  (2024.01)
*B60K 35/28*  (2024.01)
*B60W 40/02*  (2006.01)

(52) U.S. Cl.
CPC ............ *B60W 30/06* (2013.01); *B60K 35/00* (2013.01); *B60W 40/02* (2013.01); *B60K 35/22* (2024.01); *B60K 35/28* (2024.01); *B60K 2360/16* (2024.01); *B60W 2420/403* (2013.01); *B60W 2420/54* (2013.01)

(58) Field of Classification Search
CPC .. B60W 30/06; B60W 40/02; B60W 2420/42; B60W 2420/54; B60W 10/04; B60W 10/10; B60W 10/18; B60W 10/20; B60W 2552/50; B60W 2552/53; B60K 35/00; B60K 2370/152; B60K 2370/16; B60K 2370/161; B60K 2370/167; B60K 2370/173; B62D 15/0285
See application file for complete search history.

(56) References Cited

U.S. PATENT DOCUMENTS

2012/0004809 A1    1/2012  Sasajima
2016/0288712 A1   10/2016  Noh
(Continued)

FOREIGN PATENT DOCUMENTS

| JP | 2010-215025 A | 9/2010 |
| JP | 2012-217000 A | 11/2012 |
| JP | 2013-021468 A | 1/2013 |

(Continued)

OTHER PUBLICATIONS

Machine Translation of JP2015016803A PDF File Name: "JP2015016803A_Machine_Translation.pdf".*

*Primary Examiner* — Grant Moubry
*Assistant Examiner* — Ruben Picon-Feliciano
(74) *Attorney, Agent, or Firm* — Sughrue Mion, PLLC

(57) ABSTRACT

A vehicle control apparatus executes parking assistance control in accordance with an exit method selected on a screen. The vehicle control apparatus is configured to select an exit method estimated that a driver of a vehicle is likely to desire as a specific exit method from among a plurality of exit methods and causes a display device to display the screen in a state where the specific exit method is selected in advance.

6 Claims, 8 Drawing Sheets

(56) References Cited

U.S. PATENT DOCUMENTS

2019/0193725 A1 6/2019 Suzuki et al.
2019/0351900 A1 11/2019 Matsuda et al.

FOREIGN PATENT DOCUMENTS

| | | | | |
|---|---|---|---|---|
| JP | 2013-43510 A | | 3/2013 | |
| JP | 2015-003565 A | | 1/2015 | |
| JP | 2015016803 A | * | 1/2015 | ............... B60C 9/00 |
| WO | 2018/047222 A1 | | 3/2018 | |
| WO | 2018/168512 A1 | | 9/2018 | |

* cited by examiner

VEHICLE CONTROL APPARATUS

CROSS-REFERENCE TO RELATED APPLICATION

This application claims priority to Japanese Patent Application No. 2021-041944 filed on Mar. 16, 2021, incorporated herein by reference in its entirety.

BACKGROUND

1. Technical Field

The present disclosure relates to a vehicle control apparatus that executes parking assistance control.

2. Description of Related Art

There has been suggested a vehicle control apparatus configured to execute parking assistance control such that a vehicle moves to a target location set according to the situation around a vehicle (see, for example, WO 2018/168512). Parking assistance control has, for example, a parking mode and an exit mode. The parking mode is a mode for parking a vehicle. The exit mode is a mode for causing a parked vehicle to exit to a road (moving to a road).

The apparatus described in WO 2018/168512 (hereinafter, referred to as "existing apparatus") displays on a display device a plurality of arrow marks indicating exit directions (moving directions) of the vehicle at the time of starting parking assistance control in the exit mode. When a driver selects one from among the plurality of arrow marks, the existing apparatus determines the direction indicated by the selected arrow mark as a final exit direction. The existing apparatus executes parking assistance control in the exit mode such that the vehicle moves to the determined exit direction.

SUMMARY

In the existing apparatus, a driver needs to select an arrow mark on the display device. It takes some time and effort to select the exit direction of the vehicle, so the driver feels burdensome.

The present disclosure provides a technology capable of reducing a driver's burdensome feel as compared to the existing apparatus at the time of starting parking assistance control in an exit mode.

A vehicle control apparatus according to one or more embodiments includes a sensor configured to acquire vehicle surrounding information that is information on a situation around a vehicle, a display device, and a control unit configured to execute parking assistance control to cause the vehicle to move from a current location of the vehicle to a target location in response to an assistance request. The control unit is configured to, upon receiving the assistance request in a situation in which the vehicle is parked, determine a plurality of exit methods for causing the vehicle to exit to a road, based on the vehicle surrounding information, cause the display device to display a screen showing the plurality of exit methods, and execute the parking assistance control in accordance with the exit method selected on the screen. The control unit is further configured to select the exit method estimated that a driver of the vehicle is likely to desire as a specific exit method from among the plurality of exit methods, and cause the display device to display the screen in a state where the specific exit method is selected in advance.

With the above configuration, the vehicle control apparatus displays the screen in a state where the specific exit method is selected in advance. The specific exit method is an exit method that the driver is relatively likely to desire as compared to the other exit methods. Therefore, in many cases, the driver is not required to take some time and effort to select an exit method. The vehicle control apparatus is able to reduce the possibility that the driver feels burdensome as compared to the existing apparatus.

In one or more embodiments, the control unit may be configured to execute the parking assistance control in accordance with an assistance mode. The assistance mode may include a plurality of parking modes that are modes for parking the vehicle, and a plurality of exit modes that are modes for causing the vehicle to exit. The exit method may be defined by the exit mode and an exit direction. The control unit may be configured to, when the vehicle is parked by using the parking assistance control in the parking mode, select the exit mode associated with the parking mode used when the vehicle is parked, as the exit mode of the specific exit method.

With the above configuration, the vehicle control apparatus is able to select the exit mode that the driver is likely to desire as the exit mode of the specific exit method in accordance with the parking mode used when the vehicle is parked.

In one or more embodiments, the exit direction may include a right-hand direction and a left-hand direction. The control unit may be configured to select one of the right-hand direction and the left-hand direction as the exit direction of the specific exit method based on the exit mode of the specific exit method and a position of a steering wheel of the vehicle.

With the above configuration, the vehicle control apparatus is able to select the exit direction that the driver is likely to desire as the exit direction of the specific exit method.

In one or more embodiments, the plurality of parking modes may include a first parking mode that is a mode for perpendicular parking of the vehicle by moving the vehicle forward, a second parking mode that is a mode for perpendicular parking of the vehicle by reversing the vehicle, and a third parking mode that is a mode for parallel parking of the vehicle. The plurality of exit modes may include a first exit mode that is a mode associated with the first parking mode for reversing the vehicle parked perpendicularly to exit, a second exit mode that is a mode associated with the second parking mode for moving forward the vehicle parked perpendicularly to exit, and a third exit mode that is a mode associated with the third parking mode for causing the vehicle parked parallel to exit.

In one or more embodiments, the control unit may be configured to, when the vehicle is parked without using the parking assistance control in the parking mode, when the vehicle is present in a specific region, select one of the first exit mode and the second exit mode over the third exit mode as the exit mode of the specific exit method, and, when the vehicle is not present in the specific region, select the third exit mode over the first exit mode or the second exit mode as the exit mode of the specific exit method.

For example, the specific region is a region in which perpendicular parking is generally performed. With the above configuration, the vehicle control apparatus is able to select the exit mode that the driver is likely to desire as the exit mode of the specific exit method in accordance with the region in which the vehicle is present.

In one or more embodiments, the control unit may be configured to select the specific exit method in accordance with order of preference set in advance by the driver.

In one or more embodiments, the control unit may be implemented by a microprocessor programmed to perform one or more functions described in the specification. In one or more embodiments, the control unit may be implemented entirely or partially by an integrated circuit specialized in one or more applications, that is, hardware made up of an ASIC or the like. The applicable components are not limited to those in an embodiment that will be described later.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Configuration

Figure 1:
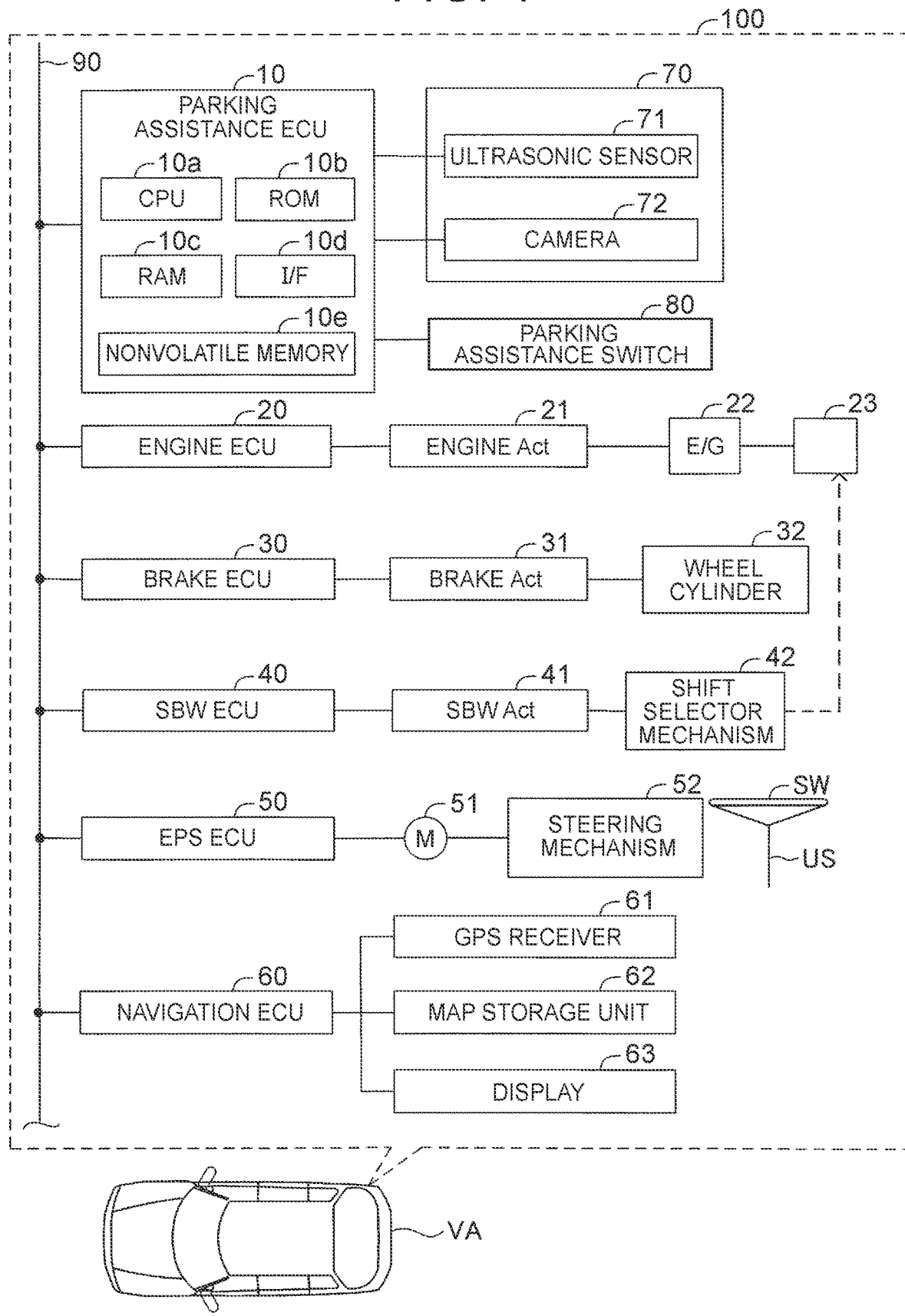
FIG. 1 is a schematic configuration diagram of a vehicle control apparatus according to an embodiment of the present disclosure.

As shown in FIG. 1, a vehicle control apparatus 100 according to an embodiment is mounted on (applied to) a vehicle VA. The vehicle control apparatus 100 includes a parking assistance ECU 10, an engine ECU 20, a brake ECU 30, a shift-by-wire (SBW) ECU 40, an electric power steering ECU (hereinafter, referred to as "EPS ECU") 50, and a navigation ECU 60. The ECUs are connected so as to be able to send and receive data to and from each other via a controller area network (CAN) 90.

An ECU is an abbreviation of electronic control unit and is an electronic control circuit that has a microcomputer including a CPU, a ROM, a RAM, an interface, a nonvolatile memory, and the like as major components. The CPU implements various functions by running instructions (routines and programs) stored in the ROM. For example, the parking assistance ECU 10 has a microcomputer including a CPU 10a, a ROM 10b, a RAM 10c, an interface (I/F) 10d, a nonvolatile memory 10e, and the like.

The engine ECU 20 is connected to an engine actuator 21. The engine actuator 21 includes a throttle valve actuator that changes the opening degree of a throttle valve of an internal combustion engine 22. The engine ECU 20 is able to change the torque generated by the internal combustion engine 22 by driving the engine actuator 21. The torque generated by the internal combustion engine 22 is transmitted to drive wheels via a transmission 23 and a driving force transmission mechanism. Therefore, the engine ECU 20 is able to control the driving force of the vehicle VA by controlling the engine actuator 21.

When the vehicle VA is a hybrid electric vehicle, the engine ECU 20 is able to control the driving force generated by any one or both of an internal combustion engine and an electric motor serving as driving sources. When the vehicle VA is a battery electric vehicle, the engine ECU 20 is able to control the driving force generated by an electric motor serving as a driving source.

The brake ECU 30 is connected to a brake actuator 31. The brake actuator 31 includes a known hydraulic circuit. The hydraulic circuit includes a reservoir, an oil pump, various valve devices, and the like. The brake actuator 31 adjusts hydraulic pressures (that is, braking pressures) respectively supplied to wheel cylinders 32 in accordance with instructions from the brake ECU 30. A friction braking force generated at each wheel varies depending on the braking pressure. Therefore, the brake ECU 30 is able to control the braking force of the vehicle VA by controlling the brake actuator 31.

The SBW ECU 40 is connected to an SBW actuator 41. The SBW ECU 40 controls the SBW actuator 41 based on the position of a shift lever (not shown). The SBW actuator 41 switches the shift position of the transmission 23 to one of a plurality of shift positions by controlling a shift selector mechanism 42 in response to an instruction from the SBW ECU 40.

In the present embodiment, the shift positions at least include a parking position in which no driving force is transmitted to the drive wheels and the vehicle VA is mechanically locked at a stopped location, a neutral position in which no driving force is transmitted to the drive wheels and the vehicle VA is not mechanically locked at a stopped location, a forward position in which a driving force that moves the vehicle VA forward is transmitted to the drive wheels, and a reverse position in which a driving force that reverses the vehicle VA is transmitted to the drive wheels.

The EPS ECU 50 is connected to an assist motor (M) 51. The assist motor 51 is incorporated in a steering mechanism 52. The steering mechanism 52 is a mechanism for turning steered wheels by turning operation of a steering wheel SW. The steering mechanism 52 includes the steering wheel SW, a steering shaft US coupled to the steering wheel SW, a steering gear mechanism (not shown), and the like. The EPS ECU 50 detects a steering torque input by a driver to the steering wheel SW with a steering torque sensor (not shown) provided in the steering shaft US, and drives the assist motor 51 based on the steering torque. The EPS ECU 50 is capable of applying steering torque (steering assist torque) to the steering mechanism 52 by driving the assist motor 51. Thus, the EPS ECU 50 assists the driver in steering operation.

In addition, when the EPS ECU 50 receives a steering instruction from the parking assistance ECU 10 during execution of parking assistance control that will be described later, the EPS ECU 50 drives the assist motor 51 based on a steering torque specified by the steering instruction. The steering torque means a torque that, different from the steering assist torque, is applied to the steering mechanism 52 in response to a steering instruction from the parking assistance ECU 10 without the necessity of steering operation of the driver. With this torque, the steered angle of the steered wheels (that is, steering angle) of the vehicle VA is changed.

The navigation ECU 60 is connected to a GPS receiver 61, a map storage unit 62, and a display (display device) 63. The GPS receiver 61 receives GPS signals for detecting the latitude and longitude of a place where the vehicle VA is located. The map storage unit 62 stores map information. The display 63 is a touch panel display. The navigation ECU 60 performs various arithmetic processing based on the latitude and longitude of the place where the vehicle VA is located, the map information, and the like and causes the display 63 to display the location of the vehicle VA on a map. Hereinafter, a display mode used at the time when the display 63 shows the location of the vehicle VA on the map is referred to as "first mode (navigation mode)".

The display mode of the display 63 also has a second mode (parking assistance mode) in addition to the first mode. The second mode is a display mode used when parking assistance control is executed and is a display mode in which various images showing a situation around the vehicle VA (described later) are displayed. When an assistance request (described later) is issued, the display mode is switched from the first mode to the second mode.

The parking assistance ECU 10 is connected to a surrounding sensor 70. The surrounding sensor 70 acquires information on a situation around the vehicle VA (hereinafter, referred to as "vehicle surrounding information"). Vehicle surrounding information includes information on objects present around the vehicle VA and information on road surface markings on a road surface around the vehicle VA. Examples of the objects include moving objects, such as vehicles, pedestrians, and bicycles, and fixed objects, such as guard rails and fences. For example, the surrounding sensor 70 includes a plurality of ultrasonic sensors 71 and a plurality of cameras 72.

Each of the ultrasonic sensors 71 sends ultrasonic waves to a predetermined range around the vehicle VA in a pulsed manner and receives a reflected wave reflected by an object. The ultrasonic sensor 71 is capable of detecting a reflected point that is a point on an object by which a sent ultrasonic wave is reflected, a distance between the ultrasonic sensor and the object, and the like based on a time taken from sending of an ultrasonic wave to reception of the ultrasonic wave.

Each of the cameras 72 is, for example, a digital camera that incorporates an imaging device, such as a charge coupled device (CCD) and a CMOS image sensor (CIS). The camera 72 acquires image data of a situation around the vehicle VA (including the location and shape of an object and the location and shape of a road surface marking) and outputs the image data to the parking assistance ECU 10.

The parking assistance ECU 10 receives vehicle surrounding information from the surrounding sensor 70 each time a predetermined time dT elapses. The parking assistance ECU 10 detects an area around the vehicle VA and in which no object is present based on the vehicle surrounding information. When the area in which no object is present is an area with a size and shape to which the vehicle VA is able to exit (or park) with a clearance, the parking assistance ECU 10 determines the area as "exit available area (or park available area)".

The parking assistance ECU 10 is connected to a parking assistance switch 80. The parking assistance switch 80 is a switch pressed by the driver when the driver makes a request of the parking assistance ECU 10 to execute parking assistance control (at the time of making an assistance request (described later)).

Screen Display

Figure 2:
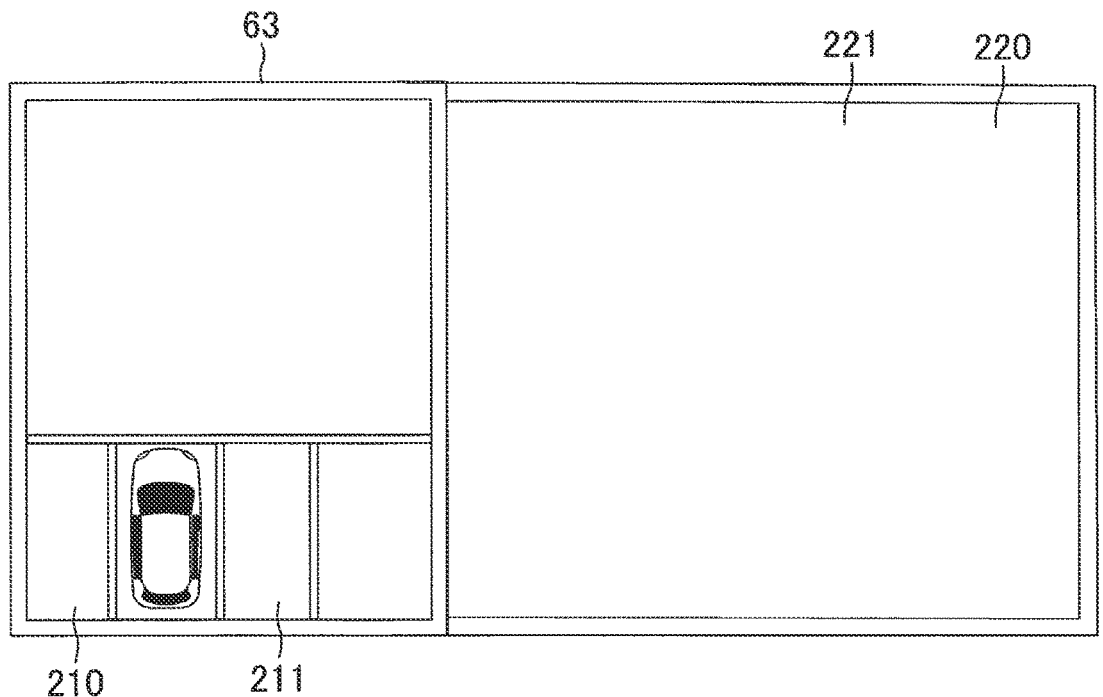
FIG. 2 is an example of an assistance mode screen displayed on a display.

Next, a screen displayed on the display 63 when the display mode is the second mode (hereinafter, referred to as "assistance mode screen") will be described. As shown in FIG. 2, the assistance mode screen has a first display area 210 and a second display area 220.

When the display mode is the second mode, the parking assistance ECU 10 causes the assistance mode screen to show a viewpoint image and a traveling direction image that will be described below. Hereinafter, a method of generating each of a viewpoint image and a traveling direction image will be simply described.

The parking assistance ECU 10 generates an image (viewpoint image) viewing the vehicle VA and an area around the vehicle VA from a set imaginary viewpoint based on image data acquired from the cameras 72 (front image data, rear image data, right-hand side image data, and left-hand side image data). Such a method of generating a viewpoint image is known (see Japanese Unexamined Patent Application Publication No. 2012-217000 (JP 2012-217000 A), Japanese Unexamined Patent Application Publication No. 2013-021468 (2013-021468 A), or the like). For example, a viewpoint image is an image looking down the vehicle VA from a location just above the vehicle VA. Such a viewpoint image is also referred to as a bird's eye image.

The parking assistance ECU 10 generates an image showing an area in the traveling direction of the vehicle VA (traveling direction image) based on front image data and rear image data. In a situation in which the vehicle VA moves forward, the parking assistance ECU 10 generates a traveling direction image showing a front area of the vehicle VA based on front image data. In a situation in which the vehicle VA is reversed, the parking assistance ECU 10 generates a traveling direction image showing a rear area of the vehicle VA based on rear image data.

As shown in FIG. 2, the parking assistance ECU 10 causes the first display area 210 to show a bird's eye image 211 and causes the second display area 220 to show a traveling direction image 221.

Assistance Mode of Parking Assistance Control

The parking assistance ECU 10 executes parking assistance control in accordance with the assistance mode. The assistance mode includes a parking mode and an exit mode. The parking mode is a mode for parking the vehicle VA to a parking space. The exit mode is a mode for causing the parked vehicle VA to exit a parking space to a road.

The parking mode includes a first parking mode PM1, a second parking mode PM2, and a third parking mode PM3. The first parking mode PM1 is a mode for perpendicular parking of the vehicle VA by moving the vehicle VA forward. Perpendicular parking means that a vehicle is parked at right angles with respect to the traveling direction of a road. When the vehicle VA is parked by using the first parking mode PM1, the vehicle VA is parked in a state where the rear of a vehicle body is oriented toward the road. The second parking mode PM2 is a mode for perpendicular parking of the vehicle VA by reversing the vehicle VA. When the vehicle VA is parked by using the second parking mode PM2, the vehicle VA is parked in a state where the front of the vehicle body is oriented toward the road. The third parking mode PM3 is a mode for parallel parking the vehicle VA. Parallel parking means that a vehicle is parked parallel to the traveling direction of the road.

The exit mode includes a first exit mode EM1, a second exit mode EM2, and a third exit mode EM3. The first exit mode EM1 is a mode associated with the first parking mode PM1 and is a mode for causing the vehicle VA parked perpendicularly to exit by reversing the vehicle VA (moving the vehicle VA to a road). The second exit mode EM2 is a mode associated with the second parking mode PM2 and is a mode for causing the vehicle VA parked perpendicularly to exit by moving the vehicle VA forward (moving the vehicle VA to a road). The third exit mode EM3 is a mode associated with the third parking mode PM3 and is a mode for causing the vehicle VA parked parallel to exit (moving the vehicle VA to a road).

Details of Parking Assistance Control

Parking assistance control in the exit mode, concerned with the features of the present embodiment, will be described. When an assistance request is issued, the parking assistance ECU 10 determines an exit method as will be described later. The exit method is defined by an exit mode and an exit direction. As described above, the exit mode includes the first exit mode EM1, the second exit mode EM2, and the third exit mode EM3. The exit direction includes a right-hand direction and a left-hand direction.

The parking assistance ECU 10 sets a target location in accordance with the determined exit method. A target location is the location of the vehicle VA at the time when the vehicle VA has exited and is a location that the central position of the vehicle VA in plan view is to reach.

The parking assistance ECU 10 computes a moving route to move the vehicle VA from a current location to the target location. The moving route is a route along which the vehicle body of the vehicle VA is able to move from the current location to the target location while leaving a predetermined clearance or greater with respect to an object (another vehicle, a curb, a guard rail, or the like). The parking assistance ECU 10 computes a moving route in accordance with one of various known computation methods (for example, a method suggested in Japanese Unexamined Patent Application Publication No. 2015-003565 (JP 2015-003565 A)).

Subsequently, the parking assistance ECU 10 determines movement assistance information for moving the vehicle VA along the moving route. The movement assistance information includes the moving direction (specifically, the shift position of the transmission 23), steered angle pattern, and speed pattern of the vehicle VA.

The parking assistance ECU 10 sends a shift control instruction to the SBW ECU 40 via the CAN 90 depending on the determined shift position. When the SBW ECU 40 receives a shift control instruction from the parking assistance ECU 10, the SBW ECU 40 changes the shift position of the transmission 23 to the position specified by the shift control instruction by driving the SBW actuator 41 (that is, the SBW ECU 40 executes shift control).

The steered angle pattern is data that associates the location of the vehicle VA on a moving route and the steered angle of the steered wheels with each other. The steered angle pattern represents a change in steered angle at the time when the vehicle VA moves along the moving route. The parking assistance ECU 10 sends a steering instruction (including a target steered angle) to the EPS ECU 50 via the CAN 90 in accordance with the steered angle pattern. When the EPS ECU 50 receives a steering instruction from the parking assistance ECU 10, the EPS ECU 50 brings an actual steered angle into coincidence with the target steered angle by driving the assist motor 51 based on a steering torque specified by the steering instruction (that is, the EPS ECU 50 executes steered angle control).

The speed pattern is data that associates the location of the vehicle VA on a moving route and the target speed of the vehicle VA with each other. The speed pattern represents a change in the speed of the vehicle VA at the time when the vehicle VA moves along the moving route. The parking assistance ECU 10 sends a driving force control instruction to the engine ECU 20 via the CAN 90 in accordance with the speed pattern. When the engine ECU 20 receives a driving force control instruction from the parking assistance ECU 10, the engine ECU 20 controls the engine actuator 21 in response to the driving force control instruction (that is, the engine ECU 20 executes driving force control). In addition, the parking assistance ECU 10 sends a braking force control instruction to the brake ECU 30 via the CAN 90 in accordance with the speed pattern. When the brake ECU 30 receives a braking force control instruction from the parking assistance ECU 10, the brake ECU 30 controls the brake actuator 31 in response to the braking force control instruction (that is, the brake ECU 30 executes braking force control).

Parking assistance control in the parking mode is similar. The parking assistance ECU 10 sets a target location that is the location of the vehicle VA at the time when the vehicle VA has been parked. The parking assistance ECU 10 computes a moving route to move the vehicle VA from a current location to the target location. The parking assistance ECU 10 determines movement assistance information for moving the vehicle VA along the moving route. The parking assistance ECU 10 executes shift control, steered angle control, driving force control, and braking force control in accordance with the movement assistance information.

Determining Exit Method

Next, a method of determining an exit method will be described. When an assistance request is issued in a situation in which the vehicle VA is parked, the parking assistance ECU 10 determines a plurality of exit methods (for causing the vehicle VA to exit to a road (that is, a plurality of exit methods executable in a current situation) based on vehicle surrounding information (specifically, an exit available area detected from vehicle surrounding information). The exit methods are candidates for a finally used exit method and are, hereinafter, referred to as "exit method candidates".

Figure 3:
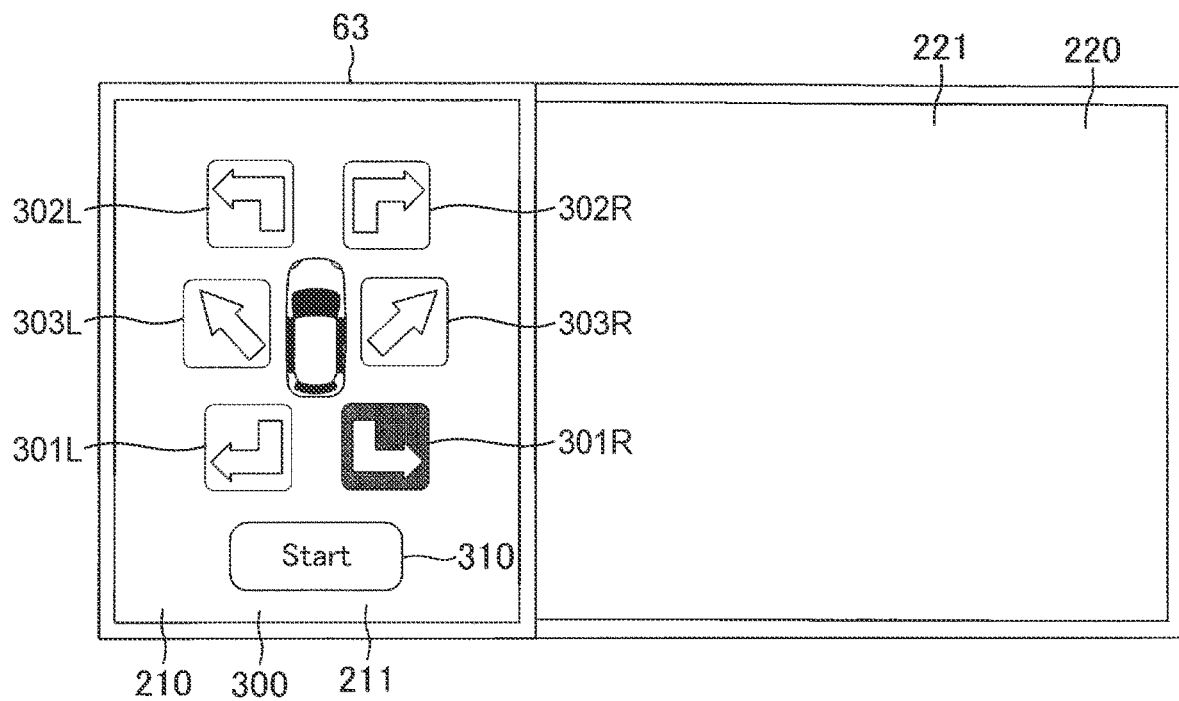
FIG. 3 is an example of a select screen displayed on the display.

When an assistance request is issued, the parking assistance ECU 10 switches the display mode of the display 63 to the second mode. As shown in FIG. 3, the parking assistance ECU 10 displays a plurality of arrow marks 301L, 301R, 302L, 302R, 303L, 303R representing the exit method candidates, and a start button 310 on the bird's eye image 211. Such a screen is a screen to select a final exit method from among the exit method candidates and is, hereinafter, called a "select screen 300".

In the present embodiment, the parking assistance ECU 10 is capable of displaying six arrow marks 301L, 301R, 302L, 302R, 303L, 303R at the maximum on the select screen 300 as exit method candidates. The arrow mark 301L represents that the exit mode is the first exit mode EM1 and the exit direction is the left-hand direction. The arrow mark 301R represents that the exit mode is the first exit mode EM1 and the exit direction is the right-hand direction. The arrow mark 302L represents that the exit mode is the second exit mode EM2 and the exit direction is the left-hand direction. The arrow mark 302R represents that the exit mode is the second exit mode EM2 and the exit direction is the right-hand direction. The arrow mark 303L represents that the exit mode is the third exit mode EM3 and the exit direction is the left-hand direction. The arrow mark 303R represents that the exit mode is the third exit mode EM3 and the exit direction is the right-hand direction.

The start button 310 is a button that is depressed by the driver when parking assistance control in the exit mode is started.

The driver selects one from among the arrow marks 301L, 301R, 302L, 302R, 303L, 303R on the select screen 300. Then, the driver depresses the start button 310. In the example of FIG. 3, the arrow mark 301R is selected. The selected arrow mark 301R is highlighted as compared to the other arrow marks. When the driver depresses the start button 310 in this state, the parking assistance ECU 10 executes parking assistance control in accordance with the exit method corresponding to the arrow mark 301R selected on the select screen 300. In other words, the parking assistance ECU 10 causes the vehicle VA to exit in the right-hand direction while reversing the vehicle VA.

Outline of Operation

As described above, with the existing apparatus, it takes some time and effort to select the exit direction of a vehicle, so the driver feels burdensome.

The parking assistance ECU 10 selects an exit method that the driver of the vehicle VA is likely to desire as a specific exit method from among the exit method candidates. The parking assistance ECU 10 displays the select screen 300 in a state where the arrow mark corresponding to the specific exit method is selected in advance.

The specific exit method is an exit method that the driver is relatively likely to desire as compared to the other exit methods. Therefore, in many cases, the driver is not required to take some time and effort to select an arrow mark (that is, an exit method). The driver is able to start parking assistance control in the exit mode only by operating the start button 310 on the select screen 300. In this way, the vehicle control apparatus 100 is able to reduce the possibility that the driver feels burdensome as compared to the existing apparatus.

Method of Determining Specific Exit Method

Next, a method of determining a specific exit method will be described. When an assistance request is issued, the CPU 10a of the parking assistance ECU 10 (simply referred to as "CPU") determines exit method candidates based on an exit available area detected from vehicle surrounding information.

Figure 4:
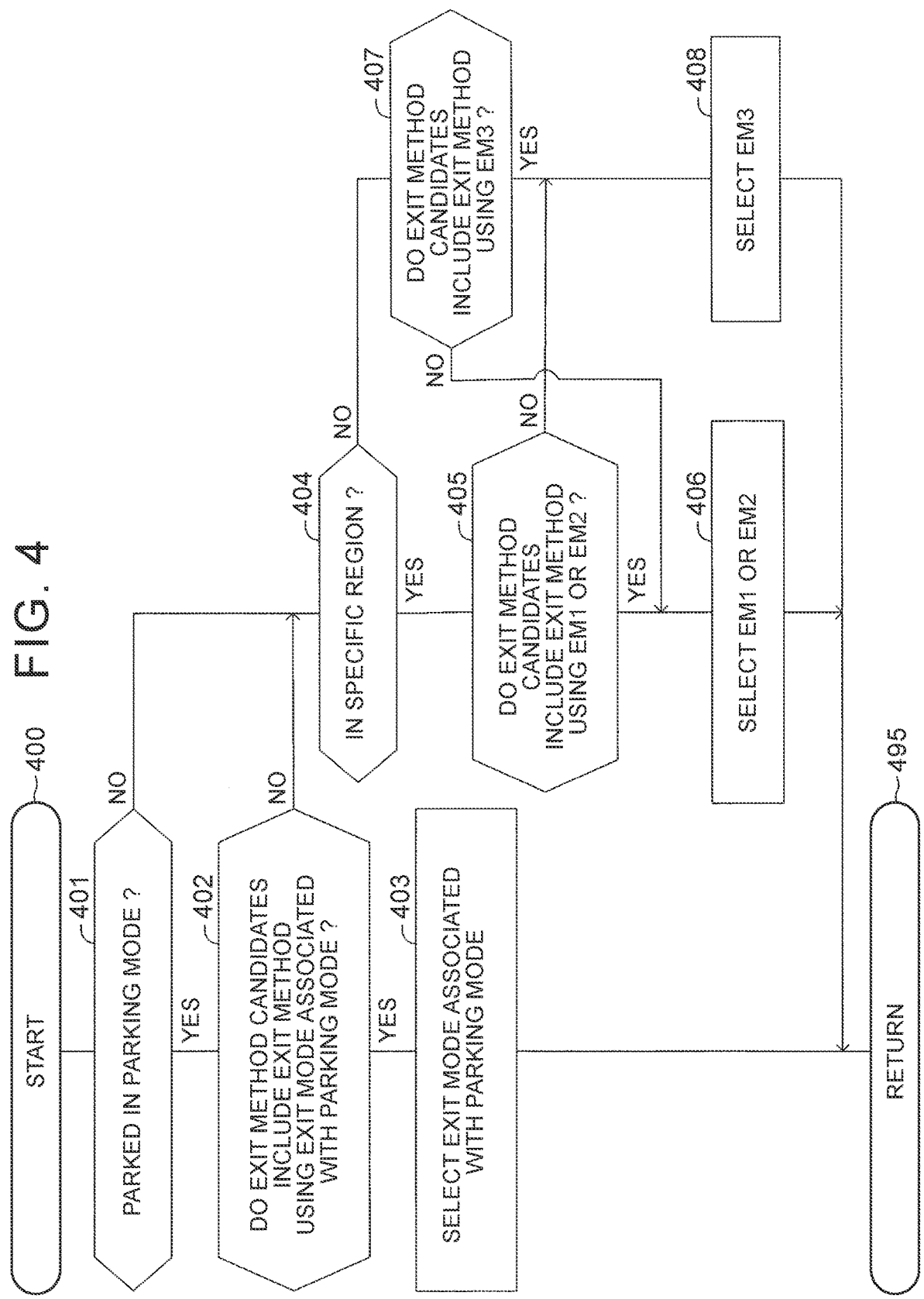
FIG. 4 is a flowchart showing a routine for selecting an exit mode of a specific exit method.
Figure 5:
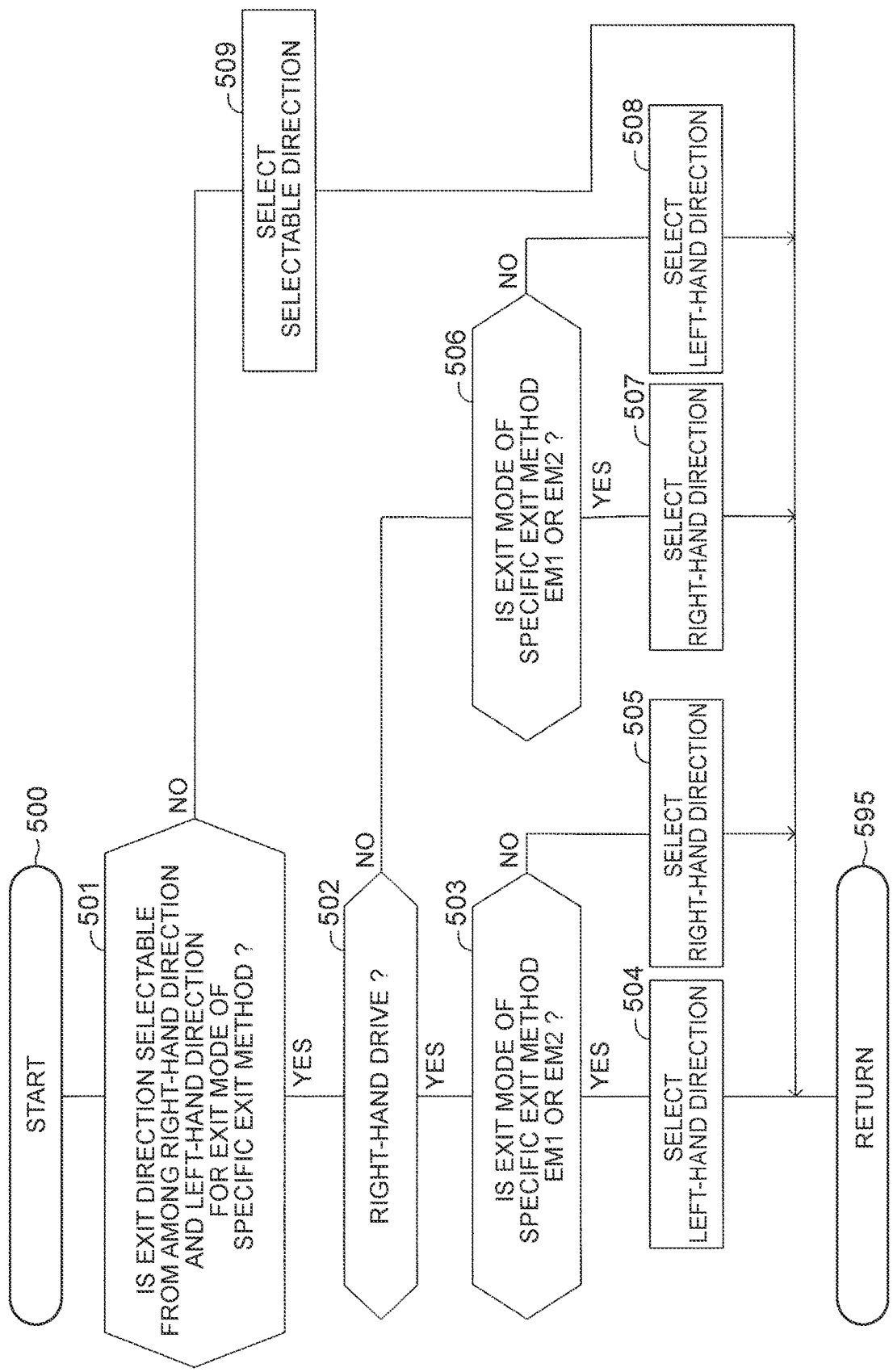
FIG. 5 is a flowchart showing a routine for selecting an exit direction of a specific exit method.

Subsequently, the CPU determines a specific exit method from among the exit method candidates by sequentially executing the routine of FIG. 4 and the routine of FIG. 5. The routine of FIG. 4 is a routine for selecting the exit mode of the specific exit method. The routine of FIG. 5 is a routine for selecting the exit direction of the specific exit method.

The CPU starts a process from step 400 of FIG. 4 and proceeds to step 401, and determines whether the vehicle VA has been parked by using parking assistance control in the parking mode. The CPU stores information on the parking mode in the nonvolatile memory 10e. Specifically, the CPU stores, in the nonvolatile memory 10e, a flag XA indicating whether parking assistance control in the parking mode is executed. When the value of the flag XA is "1", it indicates that the vehicle VA has been parked by using parking assistance control in the parking mode. When the value of the flag XA is "0", it indicates that the vehicle VA has been parked without using parking assistance control in the parking mode.

When parking assistance control in the parking mode is executed, the CPU sets the value of the flag XA to "1". In addition, the CPU also stores information on the executed parking mode (that is, information indicating any one of the first parking mode PM1, the second parking mode PM2, and the third parking mode PM3) in the nonvolatile memory 10e. The value of the flag XA is set (reset) to "0" at the time point at which the speed of the vehicle VA becomes higher than or equal to a predetermined speed threshold Vth.

The CPU determines, by referencing the flag XA, whether the vehicle VA has been parked by using parking assistance control in the parking mode. Assuming that the value of the flag XA is "1". In this case, the CPU makes affirmative determination in step 401 and proceeds to step 402. The CPU determines in step 402 whether exit method candidates include an exit method using the exit mode associated with the parking mode stored in the nonvolatile memory 10e.

When the exit method candidates include the exit method using the exit mode associated with the parking mode stored in the nonvolatile memory 10e, the CPU makes affirmative determination in step 402 and proceeds to step 403. The CPU selects the exit mode associated with the parking mode stored in the nonvolatile memory 10e (that is, the parking mode used at the time when the vehicle VA has been parked) as the exit mode of the specific exit method. After that, the CPU proceeds to step 495 and ends the routine.

For example, it is assumed that the vehicle VA has been parked by using parking assistance control in the first parking mode PM1 and then the driver uses parking assistance control in the exit mode. In this case, the driver is likely to desire the first exit mode EM1 associated with the first parking mode PM1. When the exit method candidates include the exit method using the first exit mode EM1, the CPU selects the first exit mode EM1 as the exit mode of the specific exit method. With this configuration, it is possible to select the exit mode that the driver is likely to desire as the exit mode of the specific exit method.

When the exit method candidates do not include the exit method using the exit mode associated with the parking mode stored in the nonvolatile memory 10e, the CPU makes negative determination in step 402 and proceeds to step 404. A process from step 404 will be described later.

It is assumed that the vehicle VA has been parked without using parking assistance control in the parking mode. In this case, the value of the flag XA is "0". The CPU makes negative determination in step 401 and proceeds to step 404. The CPU determines whether the vehicle VA is present in a specific region. In the present embodiment, the specific region means a region in which perpendicular parking is generally performed and is, for example, Japan, China, or the like. A region other than the specific region is a region in which parallel parking is generally performed and is, for example, Europe. The CPU may determine whether the vehicle VA is present in the specific region based on information from the navigation ECU 60.

When the vehicle VA is present in the specific region, the vehicle VA is likely to have been parked perpendicularly. Therefore, the CPU selects one of the first exit mode EM1 and the second exit mode EM2 over the third exit mode EM3 as the exit mode of the specific exit method.

Specifically, when the vehicle VA is present in the specific region, the CPU makes affirmative determination in step 404 and proceeds to step 405. The CPU determines whether the exit method candidates include an exit method using the first exit mode EM1 or the second exit mode EM2. When the exit method candidates include the exit method using the first exit mode EM1 or the second exit mode EM2, the CPU makes affirmative determination in step 405 and proceeds to step 406.

In step 406, the CPU selects the first exit mode EM1 or the second exit mode EM2 as the exit mode of the specific exit method. When the exit method candidates include the exit method using the first exit mode EM1 and does not include the exit method using the second exit mode EM2, the CPU selects the first exit mode EM1 as the exit mode of the specific exit method. When the exit method candidates does not include the exit method using the first exit mode EM1 and include the exit method using the second exit mode EM2, the CPU selects the second exit mode EM2 as the exit mode of the specific exit method. When the exit method candidates include both the exit method using the first exit mode EM1 and the exit method using the second exit mode EM2, the CPU selects the first exit mode EM1 or the second exit mode EM2 as the exit mode of the specific exit method in accordance with predetermined order of preference. In the present embodiment, the CPU preferentially selects the first exit mode EM1. After the process of step 406, the CPU proceeds to step 495 and ends the routine.

When the exit method candidates do not include any of the exit method using the first exit mode EM1 and the exit method using the second exit mode EM2, the CPU makes negative determination in step 405 and proceeds to step 408, and selects the third exit mode EM3 as the exit mode of the specific exit method. After that, the CPU proceeds to step 495 and ends the routine.

On the other hand, when the vehicle VA is not present in the specific region, the vehicle VA is likely to have been parked parallel. Therefore, the CPU selects the third exit mode EM3 over the first exit mode EM1 or the second exit mode EM2 as the exit mode of the specific exit method.

Specifically, when the vehicle VA is not present in the specific region, the CPU makes negative determination in step 404 and proceeds to step 407. The CPU determines whether the exit method candidates include the exit method using the third exit mode EM3. When the exit method candidates include the exit method using the third exit mode EM3, the CPU makes affirmative determination in step 407 and proceeds to step 408. The CPU selects the third exit mode EM3 as the exit mode of the specific exit method. After that, the CPU proceeds to step 495 and ends the routine.

When the exit method candidates do not include the exit method using the third exit mode EM3, the CPU makes negative determination in step 407 and proceeds to step 406, and, as described above, selects the first exit mode EM1 or the second exit mode EM2 as the exit mode of the specific exit method. After that, the CPU proceeds to step 495 and ends the routine.

The CPU ends the routine of FIG. 4 and then starts the routine of FIG. 5. The CPU starts a process from step 500 of FIG. 5 and proceeds to step 501. The CPU determines whether it is possible to select an exit direction from among two directions, that is, the right-hand direction and the left-hand direction, for the exit mode of the specific exit method, selected in the routine of FIG. 4. Specifically, the CPU determines whether the exit method candidates include both the following exit methods Y1, Y2.
(Exit Method Y1) The exit method that uses the exit mode of the specific exit method, selected in the routine of FIG. 4, and of which the exit direction is the left-hand direction
(Exit Method Y2) The exit method that uses the exit mode of the specific exit method, selected in the routine of FIG. 4, and of which the exit direction is the right-hand direction When the exit method candidates include only one of the exit methods Y1, Y2, it means that a selectable exit direction is limited for the exit mode of the specific exit method and only one of the right-hand direction and the left-hand direction can be selected. Therefore, the CPU makes negative determination in step 501 and proceeds to step 509, and selects the selectable direction as the exit direction of the specific exit method.

On the other hand, when the exit method candidates include both the exit methods Y1, Y2, it means that the exit direction can be selected from among two directions, that is, the right-hand direction and the left-hand direction, for the exit mode of the specific exit method. Therefore, the CPU makes affirmative determination in step 501 and proceeds to step 502, and determines whether the vehicle VA is a right-hand drive.

When the vehicle VA is a right-hand drive, the vehicle VA is likely to move on roads in a left-hand traffic region (country). Therefore, the CPU selects the exit direction of the specific exit method as follows.

Specifically, when the vehicle VA is a right-hand drive, the CPU makes affirmative determination in step 502 and proceeds to step 503, and determines whether the exit mode of the specific exit method, selected in the routine of FIG. 4, is the first exit mode EM1 or the second exit mode EM2. When the exit mode of the specific exit method is the first exit mode EM1 or the second exit mode EM2, the CPU makes affirmative determination in step 503 and proceeds to step 504, and selects the left-hand direction as the exit direction of the specific exit method. When a vehicle parked perpendicularly in a left-hand traffic region is caused to exit, a driver mostly causes the vehicle to exit in the left-hand direction. With this configuration, it is possible to select the exit direction that the driver is likely to desire as the exit direction of a specific exit method.

On the other hand, when the exit mode of the specific exit method is the third exit mode EM3, the CPU makes negative determination in step 503 and proceeds to step 505, and selects the right-hand direction as the exit direction of the specific exit method. When a vehicle parked parallel in a left-hand traffic region is caused to exit, a driver usually causes the vehicle to exit in the right-hand direction. With this configuration, it is possible to select the exit direction that the driver is likely to desire as the exit direction of a specific exit method.

When the vehicle VA is a left-hand drive, the vehicle VA is likely to move on roads in a right-hand traffic region (country). Therefore, the CPU selects the exit direction of the specific exit method as follows.

Specifically, when the vehicle VA is a left-hand drive, the CPU makes negative determination in step 502 and proceeds to step 506, and determines whether the exit mode of the specific exit method, selected in the routine of FIG. 4, is the first exit mode EM1 or the second exit mode EM2. When the exit mode of the specific exit method is the first exit mode EM1 or the second exit mode EM2, the CPU makes affirmative determination in step 506 and proceeds to step 507, and selects the right-hand direction as the exit direction of the specific exit method. When a vehicle parked perpendicularly in a right-hand traffic region is caused to exit, a driver mostly exits the vehicle in the right-hand direction. With this configuration, it is possible to select the exit direction that the driver is likely to desire as the exit direction of a specific exit method.

On the other hand, when the exit mode of the specific exit method is the third exit mode EM3, the CPU makes negative determination in step 506 and proceeds to step 508, and selects the left-hand direction as the exit direction of the specific exit method. When a vehicle parked parallel in a right-hand traffic region is caused to exit, a driver usually exits the vehicle in the left-hand direction. With this configuration, it is possible to select the exit direction that the driver is likely to desire as the exit direction of a specific exit method.

As described above, the CPU selects one of the right-hand direction and the left-hand direction as the exit direction of the specific exit method based on the exit mode of the specific exit method and the position of the steering wheel SW of the vehicle VA.

When the exit method candidates include only one exit method, the CPU determines the exit method as the specific exit method without executing the routine of FIG. 4 or the routine of FIG. 5. Then, the CPU displays the select screen 300 in a state where the arrow mark corresponding to the specific exit method is selected in advance.

OPERATION EXAMPLES

An example of a process of determining a specific exit method will be described with reference to FIG. 6 to FIG. 9.

First Example

Figure 6:
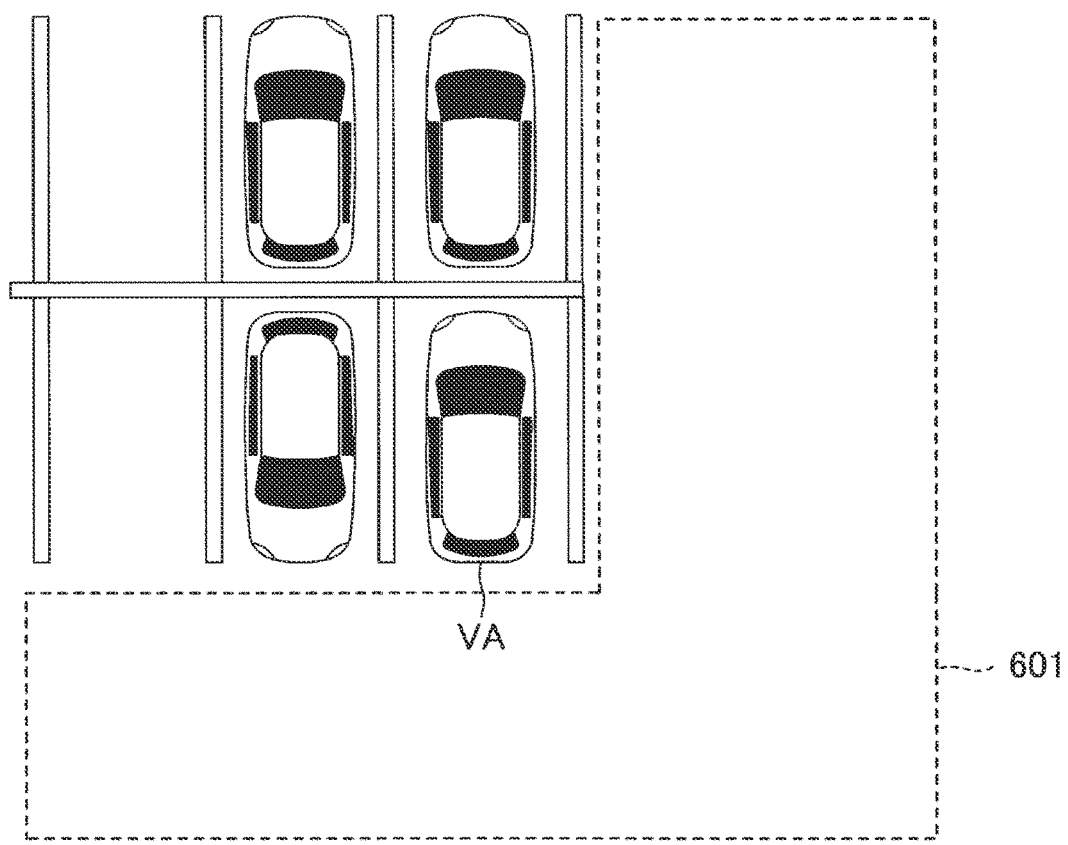
FIG. 6 is an example of a situation in which parking assistance control in an exit mode is executed.

The vehicle VA is parked perpendicularly in a parking place in an example of FIG. 6. It is assumed that the vehicle VA has been parked by using parking assistance control in the first parking mode PM1. The vehicle VA is a right-hand drive. The driver of the vehicle VA desires to cause the vehicle VA to exit (move) in the left-hand direction by using the first exit mode EM1. In this situation, the CPU determines the specific exit method as follows.

The CPU determines the following exit methods A1, A2, A3 as exit method candidates based on an exit available area 601 detected from vehicle surrounding information.
(Exit Method A1) The exit mode is the first exit mode EM1, and the exit direction is the left-hand direction.
(Exit Method A2) The exit mode is the first exit mode EM1, and the exit direction is the right-hand direction.
(Exit Method A3) The exit mode is the third exit mode EM3, and the exit direction is the right-hand direction.

The CPU executes the routine of FIG. 4. The exit method candidates include exit methods using the first exit mode EM1 associated with the first parking mode PM1 (the exit method A1 and the exit method A2). Therefore, the CPU sequentially executes the processes of step 401, step 402, and step 403 and selects the first exit mode EM1 as the exit mode of the specific exit method.

Subsequently, the CPU executes the routine of FIG. 5. For the exit mode of the specific exit method (first exit mode EM1), an exit direction can be selected from among two directions, that is, the right-hand direction and the left-hand direction. The vehicle VA is a right-hand drive. Therefore, the CPU sequentially executes the processes of step 501, step 502, step 503, and step 504 and selects the left-hand direction as the exit direction of the specific exit method. Therefore, the CPU determines the exit method A1 as the specific exit method from among the exit method candidates.

Figure 7:
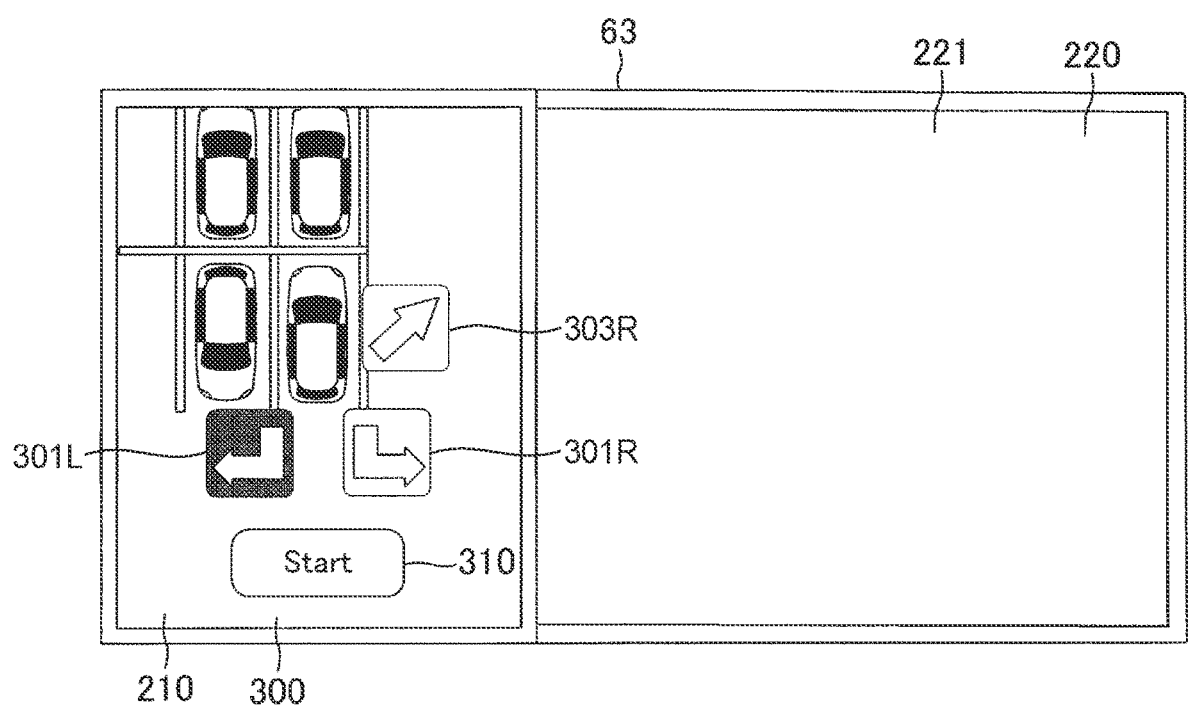
FIG. 7 is an example of a select screen displayed on the display in the situation of FIG. 6.

As shown in FIG. 7, the CPU displays the arrow marks 301L, 301R, 303R corresponding to the exit method candidates on the select screen 300. The arrow mark 301L corresponds to the exit method A1. The arrow mark 301R corresponds to the exit method A2. The arrow mark 303R corresponds to the exit method A3. The CPU displays the select screen 300 in a state where the arrow mark 301L corresponding to the specific exit method is selected in advance. In this way, the select screen 300 is displayed in a state where the exit method (arrow mark 301L) desired by the driver is selected in advance.

Second Example

It is assumed that, in the example of FIG. 6, the vehicle VA has been parked by driving operation of the driver without using parking assistance control in the parking mode. The vehicle VA is present in the specific region (for example, Japan). The vehicle VA is a right-hand drive. The driver of the vehicle VA desires to cause the vehicle VA to exit (move) in the left-hand direction by using the first exit mode EM1. In this situation, the CPU determines the specific exit method as follows.

The CPU, as in the case of the first example, determines the exit method A1, the exit method A2, and the exit method A3 as the exit method candidates.

The CPU executes the routine of FIG. 4. The CPU sequentially executes the processes of step 401, step 404, step 405, and step 406 and selects the first exit mode EM1 as the exit mode of the specific exit method. Subsequently, the CPU executes the routine of FIG. 5. The CPU, as in the case of the first example, sequentially executes the processes of step 501, step 502, step 503, and step 504 and selects the left-hand direction as the exit direction of the specific exit method. From above, the CPU determines the exit method A1 as the specific exit method from among the exit method candidates.

As shown in FIG. 7, the CPU displays the select screen 300 in a state where the arrow mark 301L corresponding to the specific exit method is selected in advance. In this way, the select screen 300 is displayed in a state where the exit method (arrow mark 301L) desired by the driver is selected in advance.

Third Example

Figure 8:
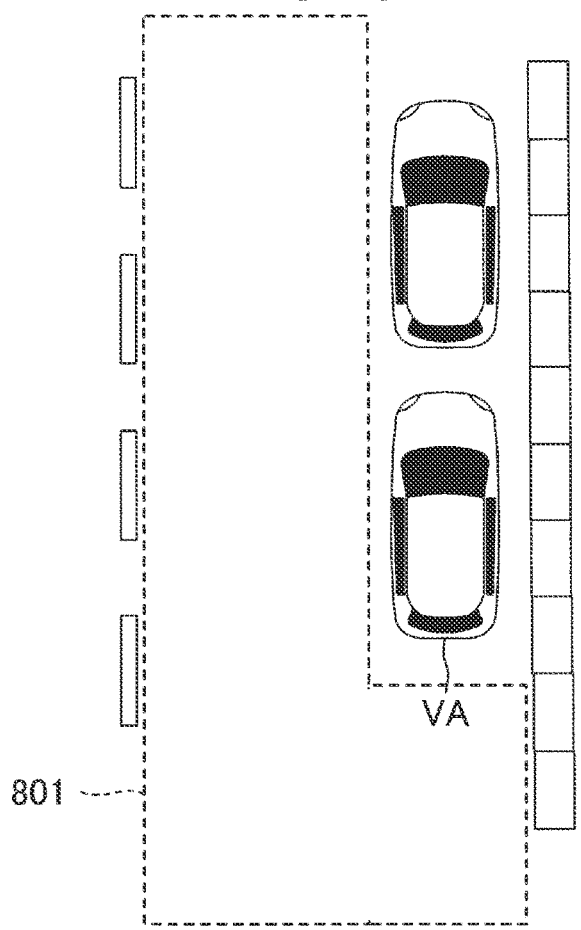
FIG. 8 is an example of a situation in which parking assistance control in an exit mode is executed.

In an example of FIG. 8, the vehicle VA is parked parallel on a right-hand traffic road. It is assumed that the vehicle VA has been parked by using parking assistance control in the third parking mode PM3. The vehicle VA is a left-hand drive. The driver of the vehicle VA desires to cause the vehicle VA to exit (move) in the left-hand direction by using the third exit mode EM3. In this situation, the CPU determines the specific exit method as follows.

The CPU determines the following exit method B1 and exit method B2 as exit method candidates based on an exit available area 801 detected from vehicle surrounding information.
(Exit Method B1) The exit mode is the first exit mode EM1, and the exit direction is the left-hand direction.
(Exit Method B2) The exit mode is the third exit mode EM3, and the exit direction is the left-hand direction.

The CPU executes the routine of FIG. 4. The exit method candidates include exit methods using the third exit mode EM3 associated with the third parking mode PM3 (exit method B2). Therefore, the CPU sequentially executes the processes of step 401, step 402, and step 403 and selects the third exit mode EM3 as the exit mode of the specific exit method.

Subsequently, the CPU executes the routine of FIG. 5. For the exit mode of the specific exit method (third exit mode EM3), the CPU is able to select only the left-hand direction as the exit direction. Therefore, the CPU sequentially executes the processes of step 501 and step 509 and selects the left-hand direction as the exit direction of the specific exit method. Therefore, the CPU determines the exit method B2 as the specific exit method from among the exit method candidates.

Figure 9:
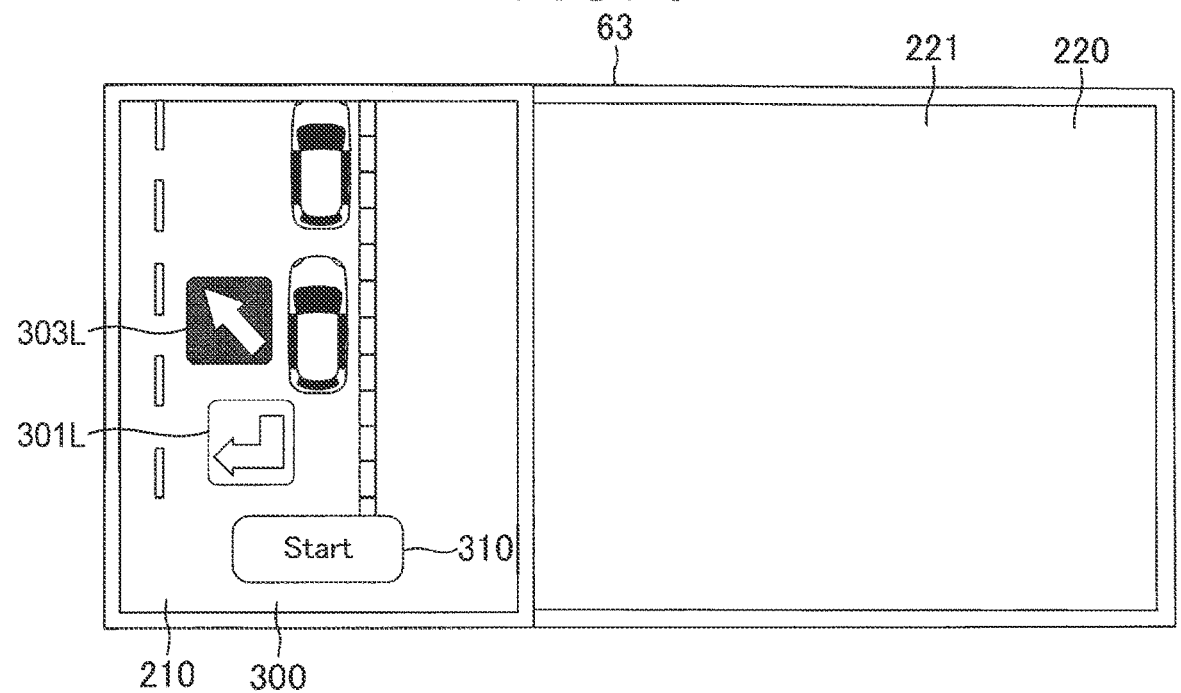
FIG. 9 is an example of a select screen displayed on the display in the situation of FIG. 8.

As shown in FIG. 9, the CPU displays the arrow marks 301L, 303L corresponding to the exit method candidates on the select screen 300. The arrow mark 301L corresponds to the exit method B1. The arrow mark 303L corresponds to the exit method B2. The CPU displays the select screen 300 in a state where the arrow mark 303L corresponding to the specific exit method is selected in advance. In this way, the select screen 300 is displayed in a state where the exit method (arrow mark 303L) desired by the driver is selected in advance.

Fourth Example

It is assumed that, in the example of FIG. 8, the vehicle VA is parked by driving operation of the driver without using parking assistance control in the parking mode. The vehicle VA is present in the region other than the specific region (for example, Europe). The vehicle VA is a left-hand drive. The driver of the vehicle VA desires to cause the vehicle VA to exit (move) in the left-hand direction by using the third exit mode EM3. In this situation, the CPU determines the specific exit method as follows.

The CPU, as in the case of the third example, determines the exit method B1 and the exit method B2 as the exit method candidates.

The CPU executes the routine of FIG. 4. The CPU sequentially executes the processes of step 401, step 404, step 407, and step 408 and selects the third exit mode EM3 as the exit mode of the specific exit method. Subsequently, the CPU executes the routine of FIG. 5. For the exit mode of the specific exit method (third exit mode EM3), the CPU is able to select only the left-hand direction as the exit direction. Therefore, the CPU sequentially executes the processes of step 501 and step 509 and selects the left-hand direction as the exit direction of the specific exit method. From above, the CPU determines the exit method B2 as the specific exit method from among the exit method candidates.

As shown in FIG. 9, the CPU displays the select screen 300 in a state where the arrow mark 303L corresponding to the specific exit method is selected in advance. In this way, the select screen 300 is displayed in a state where the exit method (arrow mark 303L) desired by the driver is selected in advance.

Operation

Next, a process of executing parking assistance control in the exit mode will be described with reference to FIG. 10. The CPU executes the routine of FIG. 10 each time a predetermined time dT elapses.

The CPU acquires vehicle surrounding information from the surrounding sensor 70 by executing a routine (not shown) each time the predetermined time dT elapses.

Figure 10:
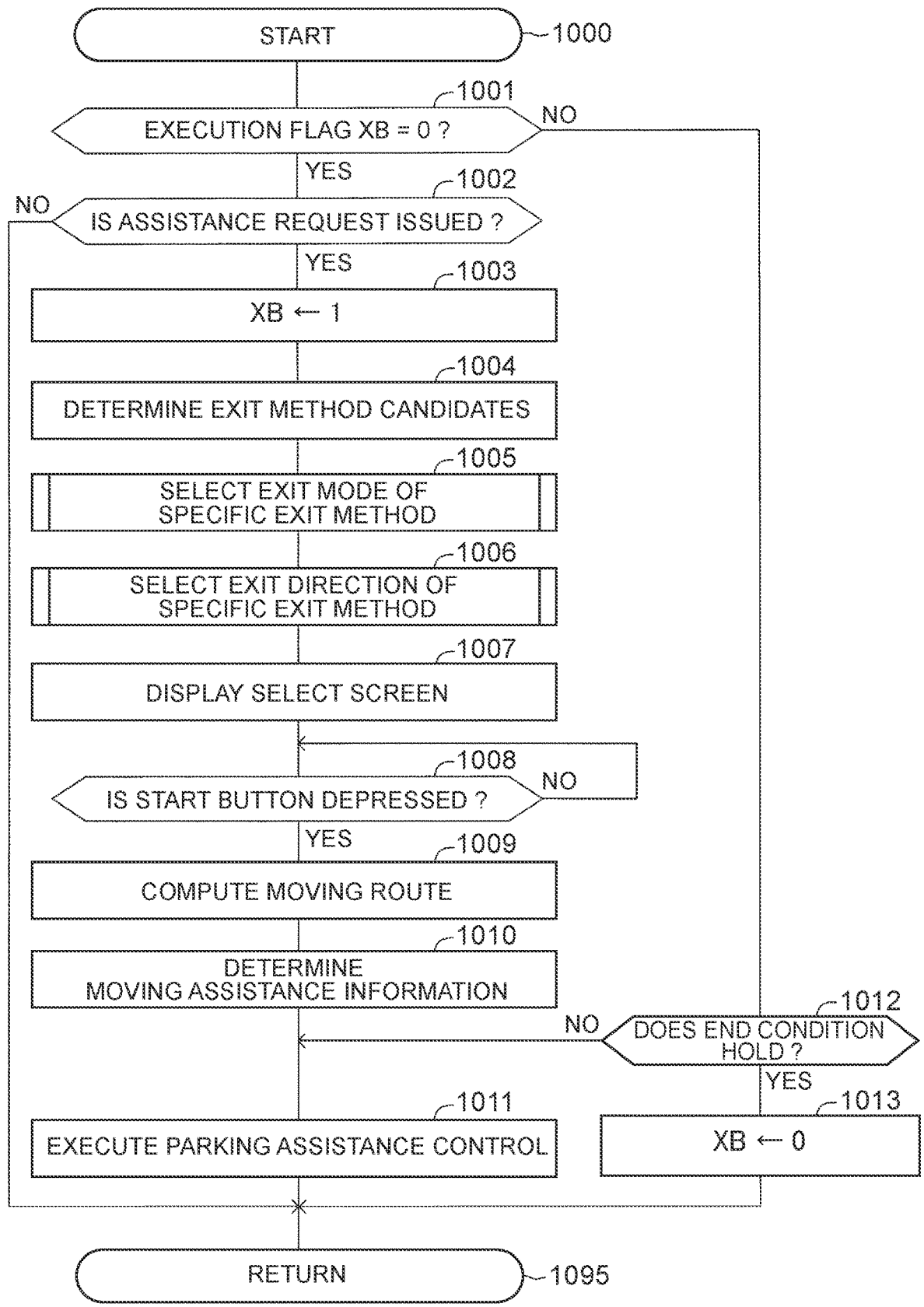
FIG. 10 is a flowchart showing a routine for executing parking assistance control in the exit mode.

When predetermined time comes, the CPU starts the process from step 1000 of FIG. 10 and proceeds to step 401, and determines whether the value of an execution flag XB is "0". When the value of the execution flag XB is "0", it means that parking assistance control has not been executed. When the value of the execution flag XB is "1", it means that parking assistance control has been executed. The value of the execution flag XB is set to "0" at the time point at which the status of an ignition switch (not shown) is changed from an on state to an off state after the vehicle VA is parked.

Assuming that the vehicle VA is parked and the value of the execution flag XB is "0". The CPU makes affirmative determination in step 1001 and proceeds to step 1002, and determines whether an assistance request is issued. When all the following conditions 1 to 3 hold, the CPU determines that an assistance request is issued. Another condition may be added as a condition for an assistance request to be issued.

(Condition 1) The parking assistance switch 80 is depressed.
(Condition 2) The shift position is in the parking position.
(Condition 3) The CPU detects an exit available area in which the vehicle VA is able to move, based on vehicle surrounding information.

When no assistance request is issued, the CPU makes negative determination in step 1002 and proceeds to step 1095, and once ends the routine.

Assuming that an assistance request is issued, the CPU makes affirmative determination in step 1002 and sequentially executes the processes of step 1003, step 1004, step 1005, step 1006, and step 1007 that will be described below. After that, the CPU proceeds to step 1008.

In step 1003, the CPU sets the value of the execution flag XB to "1". In step 1004, the CPU determines exit method candidates based on vehicle surrounding information. In step 1005, the CPU selects the exit mode of a specific exit method by executing the routine of FIG. 4. In step 1006, the CPU selects the exit direction of the specific exit method by executing the routine of FIG. 5. In step 1007, the CPU switches the display mode of the display 63 from the first mode to the second mode. The CPU displays the select screen 300. Specifically, the CPU displays arrow marks corresponding to the exit method candidates. The CPU displays the select screen 300 in a state where the arrow mark corresponding to the specific exit method is selected in advance.

Subsequently, the CPU determines in step 1008 whether the start button 310 is depressed. The CPU repeatedly executes the process of step 1008 until the start button 310 is depressed. When the start button 310 is depressed, the CPU makes affirmative determination in step 1008 and sequentially executes the processes of step 1009, step 1010, and step 1011 that will be described below. After that, the CPU proceeds to step 1095 and once ends the routine.

In step 1009, the CPU sets a target location for the exit available area based on the exit method (exit mode and exit direction) selected on the select screen 300. The CPU computes a moving route to move the vehicle VA from a current location to the target location. In step 1010, the CPU determines movement assistance information (specifically, the shift position of the transmission 23, steered angle pattern, and speed pattern) for moving the vehicle VA along the moving route In step 1011, the CPU executes parking assistance control in the exit mode. The CPU executes shift control, steered angle control, driving force control, and braking force control in accordance with the movement assistance information.

After the CPU starts parking assistance control in the exit mode, the CPU starts the routine of FIG. 10 again. When the CPU proceeds to step 1001, the CPU makes negative determination and proceeds to step 1012. The CPU determines whether a predetermined end condition holds. The end condition holds when the vehicle VA has reached the target location. When the end condition does not hold, the CPU makes negative determination in step 1012 and executes the process of step 1011 as described above. In other words, the CPU continues parking assistance control. After that, the CPU proceeds to step 1095 and once ends the routine.

On the other hand, when the end condition holds at the time point at which the CPU proceeds to step 1012, the CPU makes affirmative determination in step 1012 and proceeds to step 1013, and sets the value of the execution flag XB to "0". After that, the CPU proceeds to step 1095 and once ends the routine. Thus, parking assistance control in the exit mode is ended.

The vehicle control apparatus 100 including the above-described components displays the select screen 300 in a state where the specific exit method is selected in advance. The specific exit method is an exit method determined based on the parking mode used, the region in which the vehicle VA is present, the position of the steering wheel SW of the vehicle VA, and the like (see FIG. 4 and FIG. 5) and is an exit method that the driver is likely to desire. Therefore, in many cases, the driver is not required to take some time and effort to select an exit method. The vehicle control apparatus 100 is able to reduce the possibility that the driver feels burdensome as compared to the existing apparatus.

The applicable embodiment is not limited to the above-described embodiment, and various modifications may be employed within the scope of the present disclosure.

First Modification

The CPU may determine a specific exit method from among exit method candidates in accordance with order of preference set in advance by the driver. When the driver performs a predetermined operation on the display 63 in a situation in which the vehicle VA is stopped or parked, the CPU may display a screen 1100 shown in FIG. 11 in the second display area 220. The screen 1100 is a screen for setting the order of preference of the exit mode and the order of preference of the exit direction. The screen 1100 has a first button 1101 representing the first exit mode EM1 and a second button 1102 representing the second exit mode EM2. The driver is able to select any one of the first button 1101 and the second button 1102. The screen 1100 has a third button 1103 representing the left-hand direction and a fourth button 1104 representing the right-hand direction. The driver is able to select any one of the third button 1103 and the fourth button 1104.

Figure 11:
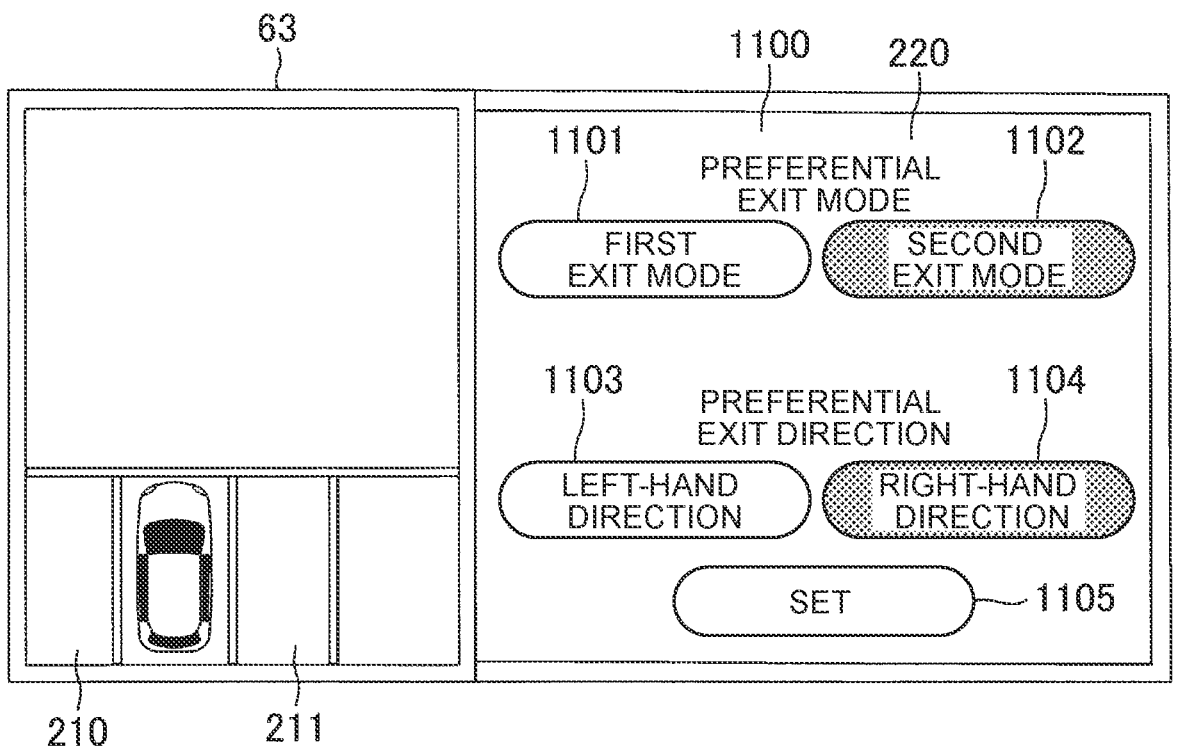
FIG. 11 is an example of a screen for setting the order of preference of the exit mode and the order of preference of the exit direction.

In an example of FIG. 11, the second button 1102 is selected, and the fourth button 1104 is selected. In this state, the driver depresses a set button 1105. In this case, when the CPU selects the exit mode of the specific exit method, the CPU selects the second exit mode EM2 over the first exit mode EM1. When the CPU proceeds to step 406 of the routine of FIG. 4, the CPU selects the second exit mode EM2 as the exit mode of the specific exit method.

When the CPU selects the exit direction of the specific exit method, the CPU selects the right-hand direction over the left-hand direction. In this configuration, the CPU omits the processes of step 502, step 503, step 504, step 505, step 506, step 507, and step 508 of the routine of FIG. 5. When the CPU makes affirmative determination in step 501, the CPU selects the right-hand direction as the exit direction of the specific exit method.

Second Modification

The CPU may record the history of exit methods (exit modes and exit directions) selected by the driver on the select screen 300 in the nonvolatile memory 10e. The CPU may select the exit mode that the driver selects the greatest number of times as the exit mode of the specific exit method. The CPU may select the exit direction that the driver selects the greatest number of times as the exit direction of the specific exit method.

Third Modification

In the above-described embodiment, the CPU is configured to be capable of executing the three parking modes PM1, PM2, PM3 and the three exit modes EM1, EM2, EM3; however, the configuration is not limited thereto. For example, the parking mode may include only the second parking mode PM2 and the third parking mode PM3, and the exit mode may include only the second exit mode EM2 and the third exit mode EM3. In other words, the CPU may be configured to be capable of executing two parking modes PM2, PM3 and two exit modes EM2, EM3.

Fourth Modification

When the vehicle VA cannot be moved to a target location only by reversing the vehicle VA once, the CPU may compute a moving route as follows. For example, the CPU computes a first route for moving forward or reversing the vehicle VA from a current location of the vehicle VA to a traveling direction select location (that is, a location at which the vehicle VA temporarily stops to select the shift position of the transmission 23) and a second route for moving forward or reversing the vehicle VA from the traveling direction select location to a target location. In this case, the exit direction of an exit method indicates a direction in which the first route extends.

What is claimed is:

1. A vehicle control apparatus comprising:
a sensor configured to acquire vehicle surrounding information that is information on a situation around a vehicle;
a display; and
a control unit comprising at least one processor that executes a program stored in a memory, wherein the control unit is configured to execute parking assistance control to cause the vehicle to move from a current location of the vehicle to a target location in response to an assistance request, wherein:
the control unit is configured to, upon receiving the assistance request in a situation in which the vehicle is parked;
determine a plurality of exit methods for causing the vehicle to exit to a road, based on the vehicle surrounding information,
cause the display to display a screen showing the plurality of exit methods, and
execute the parking assistance control in accordance with at least one of the plurality of exit methods selected on the screen; and
the control unit is further configured to:
select at least one of the plurality of exit methods estimated that a driver of the vehicle is likely to desire as a specific exit method from among the plurality of exit methods, and
cause the display to display the screen in a state where the specific exit method is selected in advance, wherein:
the control unit is configured to execute the parking assistance control in accordance with an assistance mode;
the assistance mode includes
a plurality of parking modes that are modes for parking the vehicle, and
a plurality of exit modes that are modes for causing the vehicle to exit;
wherein each of the plurality of exit methods is defined by at least one of the plurality of exit modes and also is defined by an exit direction; and
the control unit is configured to, when the vehicle is parked by using the parking assistance control in the parking mode, select at least one of the plurality of exit modes associated with the parking mode used when the vehicle is parked, as a specific exit mode of the specific exit method.

2. The vehicle control apparatus according to claim 1, wherein:
the exit direction includes a right-hand direction and a left-hand direction; and
the control unit is configured to select one of the right-hand direction and the left-hand direction as the exit direction of the specific exit method based on the exit mode of the specific exit method and a position of a steering wheel of the vehicle.

3. The vehicle control apparatus according to claim 2claim 1, wherein:
the plurality of parking modes includes
a first parking mode that is a mode for perpendicular parking of the vehicle by moving the vehicle forward,
a second parking mode that is a mode for perpendicular parking of the vehicle by reversing the vehicle, and
a third parking mode that is a mode for parallel parking the vehicle;
the plurality of exit modes includes
a first exit mode that is a mode associated with the first parking mode for reversing the vehicle parked perpendicularly to exit,
a second exit mode that is a mode associated with the second parking mode for moving forward the vehicle parked perpendicularly to exit, and
a third exit mode that is a mode associated with the third parking mode for causing the vehicle parked parallel to exit.

4. The vehicle control apparatus according to claim 3, wherein:
the control unit is configured to, when the vehicle is parked without using the parking assistance control in the parking mode,
when the vehicle is present in a specific region, select one of the first exit mode and the second exit mode over the third exit mode as the exit mode of the specific exit method, and
when the vehicle is not present in the specific region, select the third exit mode over the first exit mode or the second exit mode as the exit mode of the specific exit method.

5. The vehicle control apparatus according to claim 1, wherein the control unit is configured to select the specific exit method in accordance with order of preference set in advance by the driver.

6. A vehicle control apparatus comprising:
a surrounding sensor configured to acquire vehicle surrounding information that is information on a situation around a vehicle;
a display; and
at least one processor programmed to execute parking assistance control in accordance with an assistance mode, including:
receive an assistance request in a situation that the vehicle is currently parked;
determine a plurality of exit methods for causing the vehicle to exit to a road, based on the vehicle surrounding information;
wherein the assistance mode includes:
a plurality of parking modes that are modes for parking the vehicle, and
a plurality of exit modes that are modes for causing the vehicle to exit,
wherein each of the plurality of exit methods is defined by one of the plurality of exit modes and an exit direction; and
cause the display to display a screen showing the plurality of exit methods that were determined based on the vehicle surrounding information;
based upon a determination that the vehicle was parked by using the parking assistance control, select an exit mode from among the plurality of exit modes, that is associated with one of the plurality of parking modes that was used when the vehicle was parked;
determine a specific exit method, from among the plurality of exit methods, that a driver of the vehicle is likely to desire based on the selected exit mode;
cause the display to display the screen in a state that the specific exit method is selected in advance from among the plurality of exit methods being displayed; and
execute the parking assistance control in accordance with the specific exit method selected on the screen, to cause the vehicle to move from a current location of the vehicle to a target location.

\* \* \* \* \*